Nov. 30, 1965     J. E. LINDBERG, JR     3,221,319
HEAT DETECTION SYSTEM WITH TESTING MEANS
Original Filed May 25, 1959     2 Sheets-Sheet 1

INVENTOR.
JOHN E. LINDBERG, JR.
BY
ATTORNEY

Nov. 30, 1965     J. E. LINDBERG, JR     3,221,319

HEAT DETECTION SYSTEM WITH TESTING MEANS

Original Filed May 25, 1959     2 Sheets-Sheet 2

INVENTOR.
JOHN E. LINDBERG, JR.

BY

*Owen, Wickersham & Erickson*

ATTORNEY

United States Patent Office 3,221,319
Patented Nov. 30, 1965

3,221,319
HEAT DETECTION SYSTEM WITH
TESTING MEANS
John E. Lindberg, Jr., 1211 Upper Happy Valley Road,
Lafayette, Calif.
Original application May 25, 1959, Ser. No. 815,406, now
Patent No. 3,122,728, dated Feb. 25, 1964. Divided
and this application Feb. 8, 1962, Ser. No. 171,914
5 Claims. (Cl. 340—229)

This invention relates to improvements in method and apparatus for heat detection. This application is a division of application Serial Number 815,406, filed May 25, 1959, now Patent 3,122,728, dated Feb. 25, 1964.

The invention described in the parent application is characterized by its provision of a novel non-electric heat-detecting element or sensor able to detect at any of a wide range of critical temperatures. Only the detecting sensor need be located in the heat-detection zone and it is connected to an electrical warning or corrective system outside the zone by a novel instrument that I term a responder. The responder may most conveniently be located outside the zone in which detection is desired, though usually close to it. The actual alarm or heat-condition indicator can be connected to the responder by a wire of practically any desired length. For example, the non-electric heat-detecting sensor may be inside a house, the responder just outside the house, and the indicator at the fire station. Or, the non-electric heat-detecting sensor may be in zone 1 of an aircraft engine, ahead of a fire wall; then the responder may be behind the fire wall, and the indicator on the aircraft instrument panel.

Furthermore, the novel heat-detecting sensor may be filamentary, a long, very-narrow-diameter, hollow tube, which may extend along a line, around a circle, or along any desired path and for practically any desired length. The warning circuit can be operated at an impedance of less than one ohm, an impedance so low that complete immersion of the circuit in water does not seriously affect its operation. The temperature detector is capable of indefinitely recycling to give warning each time a critical elevated temperature is reached and to withdraw the warning each time the temperature drops. Being a completely hermetically sealed heat-detection transducer, it is completely free from environmental errors caused by such things as pressure and altitude changes, moisture condensation, and so on.

The system can both: (1) detect and warn when the *average temperature* of the continuous detecting element or sensor exceeds a pre-set warning level, and (2) give overheat warning when *any small section* exceeds a chosen higher temperature, and (3) give a fire warning when *any section* of the transducer exceeds the fire temperature, e.g., 1500° F. or above. It is capable of indicating average temperatures in two well-defined temperature ranges. Further, sharp changes in the pressure-temperature response characteristics, which occur at the transition point between these two ranges, may be utilized to indicate certain temperature conditions. Several non-electric heat-detecting transducers can be used in combination with a single electrical circuit, to achieve simplicity while still pinpointing which transducer has been actuated and to what extent it has been actuated.

An object of the present invention is to provide improved test means for such a system.

Other objects and advantages of the invention will appear from the following description of several preferred embodiments thereof.

Figure 1:
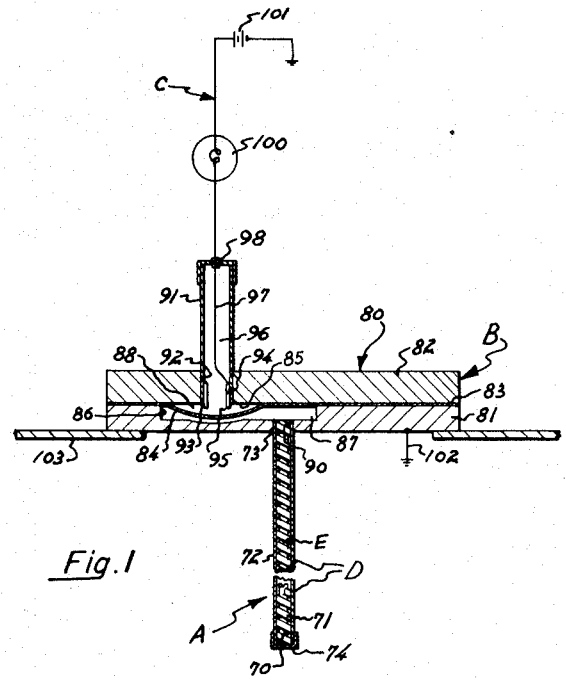
FIG. 1 is an enlarged view in elevation and in section of a simplified form of temperature-detection system showing the responder and a heat-detection sensor, broken in the middle to conserve space. The electrical circuit is shown diagrammatically.

As shown in FIG. 1 the temperature detection system used in this invention comprises (1) a non-electric detection means, preferably in the form of a generally filamentary sensor A, (2) a responder B, and (3) an electrical circuit C. The sensor A is made of indeterminate length and does not include any element of the electrical circuit C or any other electrical circuit. Its function is to actuate the responder B, and the function of the responder B is to actuate the electrical circuit C in response to predetermined conditions of temperature obtaining in the environment within which the sensor A is located. Thus, the sensor A and the responder B, considered together, comprise a transducer.

The sensor A may be further defined in general terms (see FIGS. 1–5) as a generally filamentary enclosure D of extended length connected to the responder B and containing means E responsive to heat in the environment of the sensor A, for raising the pressure in the responder B. The responder B may be thought of as typically a pressure-actuated electrical switch that opens or closes the electrical circuit C in response to pressure changes induced by the sensor A as it responds to heat. The electrical circuit C may be a warning circuit or a remedial circuit. Several responders B may be used in one circuit, if desired, to control it in some manner that depends on the temperature conditions of the environments to which the sensors A are exposed.

The sensor A

The sensor A has an enclosure D, preferably comprising a narrow-diameter metal tube of constant cross-sectional area and of any desired length. Within this enclosure D is means E responsive to the temperature of the enclosure D for varying the pressure inside the enclosure D. This means E may also be referred to as a transducing agent or as a gas-emitting agent. The enclosure D is gas-tight and its only opening is connected to the responder B, which itself defines a closed chamber connected to the enclosure D. An alteration of the internal pressure within the enclosure D therefore affects the responder B.

(a) The transducing agent E

This invention depends upon the ability of certain classes of substances herein called transducing agents E, to release or emit large volumes of gases or vapors when elevated to a temperature sought to be detected. When these materials are enclosed in a constant-volume container D and subjected to temperature changes, the resultant alteration of pressure within this container D is employed to actuate the responder B to close or open warning system C.

Several basic types of materials are suitable transducing agents E: (1) materials that retain gas at low temperatures and emit gas progressively over a wide range of elevated temperatures; and (2) materials that retain relatively small quantities of gas at low temperatures and absorb large quantities of gas as the temperature is elevated over a wide range. Although these two types of materials and their characteristic phenomena have been observed for many years, about the only practical applications of them heretofore have been in the vacuum tube industry to take up residual gases in the tube after sealing.

Class (1) above includes heat-dissociable materials such as the alkaline and alkaline earth hydrides and the hydrides of certain other metals, listed below. These materials, when subjected to an increase in temperature, emit gas and therefore may be employed as a means for altering the internal pressure of a container D in which they are enclosed. With the alkali and alkaline earth metals, i.e., Groups I-a and II-a of the Periodic Table, hydrogen forms stoichiometric compounds such as sodium hydride, and calcium hydride. These are ionic in behavior, with hydrogen as the negative ion. The reactions are reversible and exothermic and are useful in this invention. Specifically, hydrogen reacts with lithium, sodium, potassium, rubidium, cesium, calcium, radium, strontium, francium, and barium, in stoichiometric proportions to form hydrides.

With the elements of Groups III-a (including the rare earth and actinide elements), IV-a and Va, hydrogen forms pseudohydrides. The solubility of hydrogen in elements of these groups varies as the square root of the pressure, and it decreases with increase in temperature. Palladium also behaves in this way, at least in some temperature ranges. Elements of these groups are designated as "Group B", the class consisting of scandium, titanium, vanadium, ytterbium, zirconium, niobium, hafnium, tantalum, palladium, the rare earth metals (atomic numbers 57 through 71), and the actinide metals (atomic numbers 89 through 103). This solution is commonly termed a "hydride," though it is not a stoichiometric compound. Examples of the sorptive capacities as a function of temperature of some materials chosen from the hydrides of Group B are given in Table I.

TABLE I

*Sorption of hydrogen by typical metals of Group B*

[In cm.³ (S.T.P.) per gm., at 1 atm.]

| Temperature | Titanium | Vanadium | Zirconium |
| --- | --- | --- | --- |
| 20 | 407.4 | 150 | 235.5 |
| 400 | 387.7 | 38 | |
| 600 | 334.7 | 10 | 184 |
| 800 | 140.9 | 4.4 | 165 |
| 1,000 | 66.1 | 2.5 | 78 |

Class (2) materials, in contrast to those of class (1) absorb gas when subjected to a temperature elevation. They also may be employed to alter the internal pressure of a container in which they are enclosed. For example, hydrogen interacts with what are known as the "Group A metals", consisting of copper, silver, molybdenum, tungsten, iron, cobalt, nickel, aluminum, platinum, maganese, technetium, rhenium, osmium, iridium, ruthenium, and rhodium; chromium is a member of this group at temperatures greater than about 300° C. The action appears to be a type of solubility, and the solubility increases with increasing temperature. Examples of the sorptive capacities of typical class A materials are illustrated in Table II.

TABLE II

*Sorption of hydrogen by typical metals of Group A*

[In cm.³ (S.T.P.) per 100 gms., at 1 atm.]

| Temperature, ° C. | Nickel | Copper | Chromium |
| --- | --- | --- | --- |
| 200 | 1.70 | | |
| 400 | 3.15 | 0.06 | |
| 600 | 5.25 | 0.30 | 0.5 |
| 1,000 | 9.80 | 1.58 | 3.0 |

Oxygen also reacts similarly with some metals, but in many cases it is difficult to distinguish between solution of oxygen and solution of oxides. However, the formation of true solutions has been determined in silver, copper, cobalt, and a few other metals. Examples of the solubility of oxygen in silver and copper are listed in Tables III and IV.

TABLE III

*Solubility of oxygen in silver at 1 atm. pressure*

| T., ° C.: | cm.³/100 g. |
| --- | --- |
| 400 | 0.83 |
| 600 | 1.26 |
| 800 | 3.37 |

TABLE IV

*Solubility of oxygen in copper at 1 atm. pressure*

| T., ° C.: | cm.³/100 g. |
| --- | --- |
| 600 | 5.0 |
| 800 | 6.0 |
| 1,050 | 11.0 |

Many other examples may be cited of gases dissolving in metals. The omission of others is not intended to exclude them from this invention.

With materials of this invention the process of sorption and desorption is reversible. Thus a sample of such material may be subjected to the sorption and desorption process for an indefinite number of repetitive cycles.

The materials of this invention as explained previously, when located within a closed chamber, provide an effective means of altering the internal pressure of the chamber. This internal pressure, as explained in my co-pending application Serial Number 759,717, filed September 8, 1958, now abandoned, is a function of the temperature applied to the material. In general, there exists a one-to-one correspondence between this pressure and the temperature. Thus, the enclosed material functions as an element which effectively converts temperature variations into pressure variations and that is why the general class of materials is referred to herein as transducing agents.

(b) Typical sensor structures

FIGS. 2–5 illustrate a few of the many ways in which the sensor A may be constructed. Transducing agents E may be used in a filamentary, pellet, or granular form, always being placed inside the sensor tube D which may be a non-porous tube of constant cross-sectional area. In applications where the tubes D are to be bent or curved around corners, metal is the preferred material. Suitable metals are pure iron, which is impermeable to many gases, stainless steel, and molybdenum, for example. In applications where bending is not required and minimum diffusion is desired, the tube D is preferably made from non-porous quartz, ceramic, or special glass. In any event, the inner surface of the tube D should not react with the materials it contacts, including the gas involved. Where the tube D is reactive with the transducing agent E, a special problem is created, which I solve as described below. A typical sensor tube D is preferably about 0.040″ to 0.060″ outside diameter with a wall thickness of preferably about 0.005″ to 0.015″. Such tubes D are preferably about two to twenty feet long, although they may be longer or shorter.

FIG. 1 shows a preferred form of transducing agent E enclosed in the sensor tube D. Here the transducing agent E is a filament 70, such as zirconium wire for Group B operation or copper wire for Group A operation, and may be about 0.025″ to 0.050″ in diameter, for example. A ribbon 71 of suitable material, such as molybdenum, preferably about 0.020″ wide and 0.002″ thick, is wrapped tightly around the filamentary transducing agent 70 and fits snugly within the tube D. The ribbon 71 physically spaces the filament 70 from the walls 72 of the tube D and prevents the transducing agent 70 from fusing or welding to the tube walls 72, even in the event that the sensor A is exposed to extreme heat.

Figure 2:
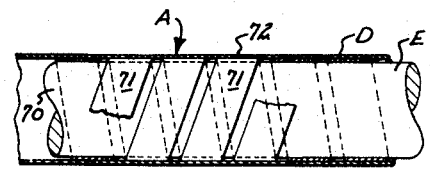
FIG. 2 is a greatly enlarged view in elevation and in section of a portion of one preferred form of a heat-detection sensor used in this invention.

As a simplified example of installation of the sensor A of FIG. 2 to the responder B, one end 73 (FIG. 1) of the tube D may be connected by a gas-tight seal to the responder B, while the other end 74 of the tube D is still open. This free end 74 may be connected to a vacuum pump and the tube D pumped free of gas. Then the tube D is heated, and then pure hydrogen is forced in through the free end 74, the zirconium filament 70 absorbing the hydrogen while it cools. When Group A material is used, hydrogen may be pumped into the tube D while the wire 70 is heated, thus ingassing it at an elevated temperature. In either event, the originally pure metal 70 is converted into an ingassed hydride. The free end 74 is then sealed off, and the device is ready for operation.

Figure 3:
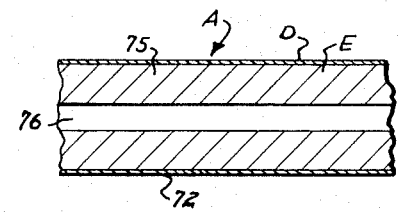
FIG. 3 is a view similar to FIG. 2 of a modified form of sensor, also embodying the principles of the invention.

In the sensor A of FIG. 3, the transducing agent E may consist of powdered hydride molded or pressed into the form of a tube 75. Hydride may be held in this form by using a suitable binder, which may be hydrolized ethyl silicate. The hole 76 which extends axially along the length of the tube 75 serves as the free volume space through which evolved gas may flow. The tube 75 is fitted snugly into the tube D, the tube-end 73 connected to the responder B, the tube D processed as described above or as desired, and the end 74 sealed.

Figure 4:
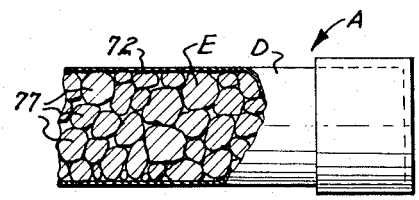
FIG. 4 is a view similar to FIG. 2 of another modified form of sensor.

The transducing agent E may be used in the form of a series of discrete pellets 77 shown in FIG. 4. The pellets 77 may be formed by molding or by dispersing powdered hydride, for example, in a binder such as hydrolized ethyl silicate and compressing the mixture into pellet form. The pellets 77 are made slightly smaller than the inside diameter of the tube wall 72 to allow passage of gas evolved from the pellets 77.

Figure 5:
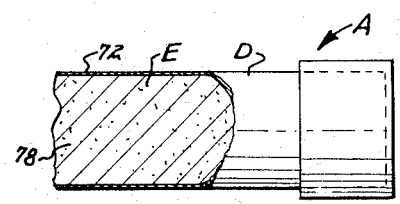
FIG. 5 is a view similar to FIG. 2 of still another modified form of sensor.

In FIG. 5 the transducing agent E comprises a series of small granules 78 within the tube D. These granules may be number 40 or 70 grit size of titanium hydride or zirconium hydride, for example.

Although only a few specific forms for the agent E have been illustrated or described, many others are possible, and it is intended that their omission not be in any sense limiting or restrictive to the possible application and construction of this invention.

*A simple form of responder B (FIG. 1)*

Any pressure switch that is properly sensitive and has the needed connections may be used as a responder B. However, I have invented a new pressure switch, claimed in a copending application, that is especially suitable for use herein.

FIG. 1 shows a simple form of responder B, suitable for simple installations. This responder B comprises a unit 80 and has two circular plates 81 and 82, preferably of non-porous metal, between which is bonded (as by brazing) a thin metal flexible disc or diaphragm 83. The plates 81 and 82 are hermetically sealed together and are in electrical contact for their full peripheries and over a substantial margin, but in the center the diaphragm 83 has a spherical depression 84 called a "blister," which is free to move relative to the plates 81 and 82 and constitutes the active or movable part of the diaphragm 83. Use of a diaphragm with a blister 84 makes possible the use of an upper plate 82 with a planar lower surface 85 and gives a more predictable response, but other diaphragm structures may be used where feasible. The lower plate 81 is formed with a recess 86 in its upper surface, and the diaphragm 83 divides the resultant cavity between the plates into two regions or chambers 87 and 88. Since the lower region 87 communicates with the sensor A, it may be called the "sensor chamber." The other region 88 is located on the opposite side of the diaphragm 83 from the sensor A; so it may be called the "anti-sensor chamber." Of course, either plate 81 or 82 may actually be made by brazing together several thin plates of the desired configuration, and the recess 86 may be provided by using a stack of preformed thin washers over a disc. A preferred material for all the metal elements in the responder 80 is molybdenum.

The end 73 of the sensor tube D is joined to and sealed to the lower plate 81, fitting within a hole 90. The region 87 is closed and sealed except for its communication with the lumen of the sensor tube D; so the inside of the sensor A and the sensor chamber 87 enjoy a common atmosphere to the exclusion of any other.

A tube 91 of non-porous ceramic material or other non-porous electrically-insulating material extends through an opening 92 in the upper plate 82 and is hermetically sealed in place there with its lower end 93 flush with the bottom surface 85 of the plate 82. The hole 92 and tube 91 are preferably centered with respect to the blister 84, on the anti-sensor side thereof. A metal electrode 94 is located inside and joined securely to the tube 91 at the end 93 nearest the blister 84, with a portion 95 of the electrode 94 extending below the lower surface 85 of the plate 82. The amount by which the portion 95 extends below the surface 85 is carefully controlled so as to be uniform in each responder of any particular design. This geometry means that the blister 84 can make electrical contact with the electrode portion 95 when the blister 84 is forced up by pressure in the sensor chamber 87. As shown, the electrode 94 may be annular to give good uniform contact with the blister 84 at that time and also to afford communication between the chamber 88 and the inside 96 of the tube 91. A conducting wire 97 extends from the electrode 94, preferably along the axis of the tube 91 and is brought out of the tube 91 through a hermetic seal at a sealing cap 98. The tube interior 96 and the anti-sensor chamber 88 thus enjoy a common atmosphere to the exclusion of any other.

If sufficient pressure is applied to the sensor side of the blister 84, it will deflect and make contact with the electrode portion 95, and if the deflecting force is removed the restoring force of the blister 84 will return it to its relaxed position and thus break contact with the electrode portion 95. The force necessary to do this may be chosen by proper design of the blister to accommodate a wide range of values.

*A simple circuit C and its operation (FIG. 1)*

As explained before, the responder B may be connected to an alarm circuit which, as shown in FIG. 1, is a simple visual indicator consisting of a lamp 100 in series with the conducting wire 97 and a source 101 of electrical current, which may be a battery as shown or may be a source of alternating current. A return path for the electrical circuit C may be provided by grounding either one of the plates 81 or 82 and is shown as a ground wire 102 in FIG. 1.

In operation, when the sensor A is exposed to heat at a level high enough to cause the transducing agent E to rise above its threshold temperature, gas is emitted. This gas cannot escape from the sensor tube D except into the sensor chamber 87, where it exerts pressure upon the blister 84. This pressure tends to move the blister 84 away from the plate 81 and toward the plate 82. The pressure in the sensor chamber 87 is a function of the temperature of the sensor A, and in general there will be a one-to-one correspondence between the temperature of the sensor A and the pressure within the sensor chamber 87. This pressure, if great enough, will cause the blister 84 to make contact with the electrode 94, but no contact will be made unless the temperature of the sensor A is at or above a definite level.

When the sensor A is exposed to heat at a level high enough to cause the blister 84 to make contact with the electrode 94, current flows from the battery 101 through the lamp 100, the conductor 97, the electrode 94, and the blister 84 to the plates 81 and 82 and returns to the battery 101 through ground line 102. This current flow causes the lamp 100 to light and provides a visual indication that the temperature of the sensor A is at or above a certain level. In this sense, the device shown in FIG. 1 functions as a threshold temperature indicator. When heat is removed from the sensor A, the transducing agent E cools and reabsorbs its previously emitted gas, resulting in reduction of the pressure exerted upon the blister 84. The blister 84 moves away from the electrode 94, breaking the electrical circuit, and the lamp 100 goes out.

In practice, the sensor A is placed in the area whose temperature is to be monitored, while the responder B may be located upon or behind a shielded wall 103 or at some easily accessible area. Thus only the sensor A itself need be exposed to possible heat sources, and it contains no element of the electrical circuit. In this manner, protection for the responder B and its associated alarm circuit C may be provided.

*Some ways of setting the threshold temperature (FIG. 1)*

The force necessary to deflect the blister 84 against the electrode 94 can be chosen to accommodate a wide range of values by a suitable choice of mechanical parameters. Once this force is determined, the dimensions of the sensor tube D and the amount of transducing agent E may be chosen by design to provide the force necessary to obtain contact between the blister 84 and electrode 94, at a certain temperature.

In addition to mechanical design considerations, the necessary deflecting force may also be altered by precharging the anti-sensor chamber 88 with a gas under pressure or by partially evacuating it. To accomplish this, gas is forced into (or withdrawn from) the tube 91 after its attachment to the plate 82 and before it is closed by its cap 98. The required deflecting pressure against the blister 84 becomes greater as more gas is present in the chamber 88.

Alternatively, the deflecting pressure may be effectively lowered by precharging the inside of the sensor tube D and the sensor chamber 87 with gas. In this case, if the ambient pressure in the sensor chamber 87 is greater than normal, less than normal gaseous emission from the transducing agent E is required to deflect the blister 84 against the electrode 94.

Most gases may be employed for this purpose; however, ideally the gas should not react chemically with its surrounding materials. Particularly suitable are the inert gases, such as helium, argon, neon, and xenon, especially since they do not readily diffuse through most materials. As a consequence, a precharged pressure of argon, for example, may be maintained for an indefinite length of time to retain a desired biasing of the diaphragm 83, as described.

Figure 6:
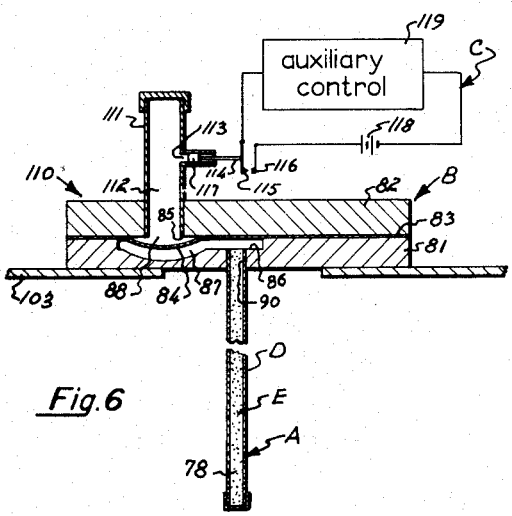
FIG. 6 is a view similar to FIG. 1, showing a somewhat different responder structure in conjunction with a different type of connection to a different electrical circuit.

*A modified form of simple responder B and its modified circuit C (FIG. 6)*

The responder B may also be so used that the variations in pressure occurring on the anti-sensor side of the diaphragm 83 will act indirectly on an auxiliary pressure switch. In this case, the blister 84 does not close against an electrode. In the unit 110 shown in FIG. 6 there is no electrode, but a ceramic tube 111 is inserted in the responder 110 as before with its interior 112 in direct communication with the anti-sensor chamber 88 and, also, via an arm 113 of the tube 111, with a conventional type of pressure switch 114. This switch 114 may be, for example, one whose contacts 115 and 116 close when pressure is applied to a piston 117.

Thus, when the sensor A is heated, the diaphragm blister 84 is deflected toward the ceramic tube 111 and causes an increase of pressure in the anti-sensor chamber 88 and tube interior 112, which in turn is communicated to the pressure switch 114. At the selected pressure, the contacts 115 and 116 of the pressure switch 114 close, and current flows from a battery 118 through an auxiliary control 119. This control 119 may be a lamp like the lamp 100, or it may be a device to perform any other suitable function, such as, for example, to operate a fire extinguisher. (Of course, the lamp 100 in FIG. 1 may also be replaced by such a control 119.) When the temperature of the sensor A falls below a certain value, the blister 84 re-deflects toward the sensor A to its normal position and decreases the pressure within the ceramic tube 111, thereby deactivating and opening the pressure switch 114. The auxiliary control 119 then ceases to function.

Alternatively, the pressure switch 114, may be such that its contacts 115 and 116 are normally closed. Then when the pressure in the interior 112 of the ceramic tube 111 is increased beyond a certain value, the applied pressure to the switch 114 opens its contacts 115 and 116. This action may be used to perform various suitable functions. For example, it may function as a thermostat. It also enables the use of type (2) transducing agent, such as copper hydride, which ingasses as the temperature rises and outgasses when the temperature drops.

*The behavior of various transducing agents E*

The operation of the illustrated systems has heretofore been described mainly with reference to Group B hydrides as the transducing agents. However, all these systems will also function with any of the other transducing agents previously described. Which one is to be preferred depends on the purpose to be served.

Class (2) materials elaborate gas when the temperature is *lowered*. Suppose, for example, that nickel hydride were used as the transducing agent E. The apparatus of FIG. 1 may be made so that the blister 84 is in its relaxed position when the sensor A is exposed to a temperature of 600° C. Then, if the temperature at the sensor A is lowered to, say 200° C., hydrogen will be emitted from the nickel hydride and deflect the diaphragm 84 against the electrode 94, energizing the alarm circuit C. In this case, the illumination of the lamp 100 indicates that the temperature in the area to which the sensor A is exposed is at or below 200° C. The reaction is reversible; so when the sensor A is again heated to 600° C., the nickel hydride reabsorbs its previously emitted hydrogen and the diaphragm 84 returns to its relaxed position, deenergizing the alarm circuit C. In this example the device was employed to indicate a temperature drop, but it will be apparent that it can be used to indicate temperature elevation as well by having the warning actuated by a circuit break instead of circuit make. This technique is well known and need not be described in detail.

*The test circuits of this invention (FIGS. 7 and 8)*

This invention relates to test circuits that rely on electrically heating a charge of hydride. Under some circumstances such a test circuit could result in heating the outside surface of the test unit to a temperature of around 2000° F., when the filament is left heating for more than about 20 seconds. Such a high temperature may sometimes be an operational hazard, particularly if high concentrations of fuel vapor are present around the responder unit. In addition, simultaneous testing of all the systems in a large installation requires a rather high current, necessitating heavy conductors. Furthermore, when the filament of the test unit heats for too long a period, the system thereafter gives less consistent results; its actuating temperature may change from test to test and the gas supply of the hydride in the test unit may gradually decrease if the sensor is pumped out after a series of tests. Apparently, the test pressure hydride becomes blocked by being overheated and does not re-ingas properly.

Figure 7:
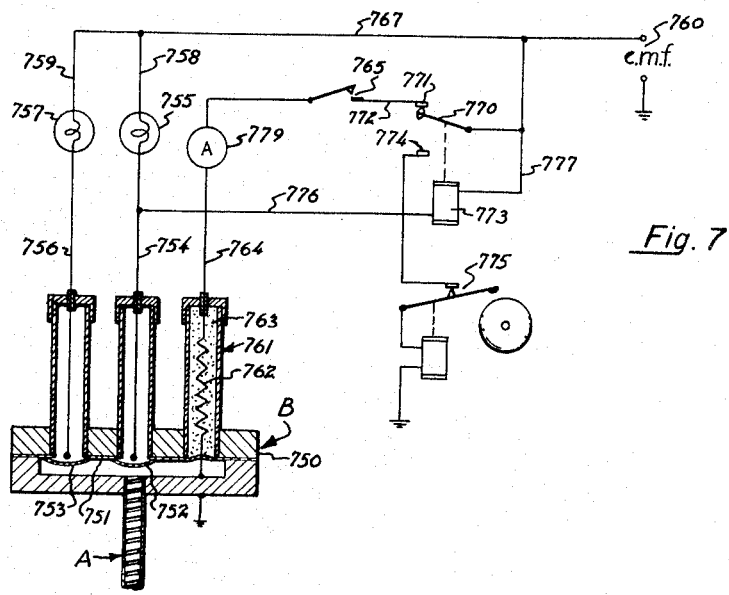
FIG. 7 is a diagrammatic view showing a test circuit embodying the principles of this invention.
Figure 8:
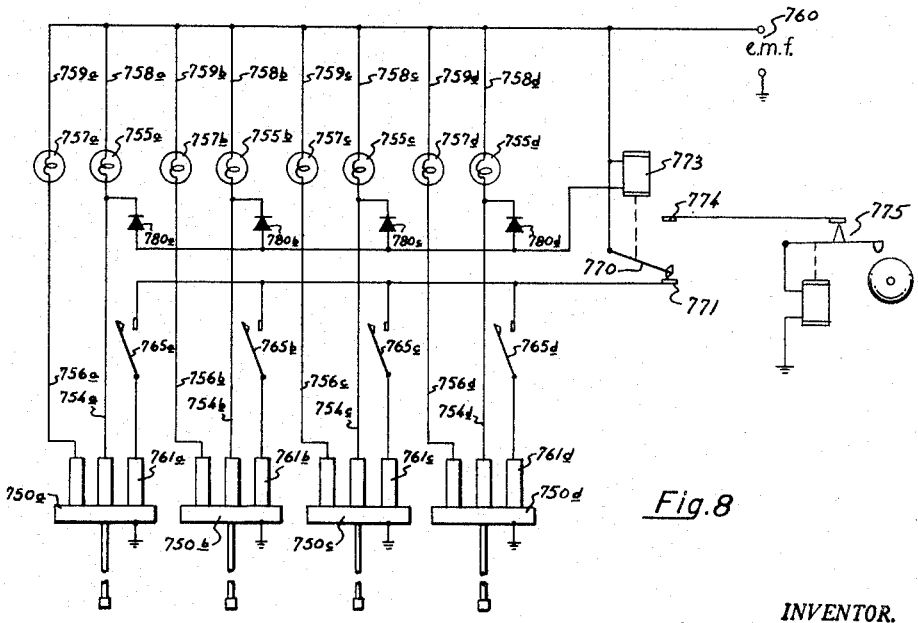
FIG. 8 is a view like FIG. 7 showing incorporation of the test circuit of FIG. 7 into an installation having a plurality of responders.

These problems are solved by the electrical circuits shown in FIGS. 7 and 8, wherein a sensitive relay is used to cut off the current to the filament as soon as the fire-alarm circuit closes. The novel arrangement prevents heating the test hydride any longer than is necessary to determine whether the detector system is functioning properly. The same relay may also be used to actuate the bell circuit, when one is present.

In FIG. 7 a responder 750 is provided with a diaphragm 751 having two blisters: a fire-warning blister 752 and an overheat blister 753, for actuating both a fire alarm and an overheat alarm from a single sensor. The responder 750 is shown here diagrammatically. The fire alarm system includes a lead 754 to an overheat lamp 755, while the overheat warning system includes a lead 756 to an overheat lamp 757. Leads 758 and 759 go from the lamps 755 and 757 to an electric power source 760. A test unit 761 has a filament 762 and hydride 763, the filament 762 being connected by a lead 764 to a test switch 765.

When most metal hydrides are purchased, it will generally be found that they are over-charged with hydrogen. Also, metallic hydrides are partly electrically conductive, and their conductivity changes with temperature. At high voltages or at high temperatures, such as may be used in the test device 763, the hydride may short-circuit the filament. Therefrom, more consistent and more accurate results are obtained by pre-conditioning the hydride.

One way of solving the electrical resistance problem just stated is to electrically insulate the hydride particles at all times, without inhibiting the passage of gas to or from the hydride. A unique way of accomplishing this is to intimately mix hydride particles with an insulating material such as powdered alumina or quartz. The particles of insulating material may be the same size as the hydride particles, or smaller, down to microscopic size. In the construction of test units, it was determined that ball-milling a mix of either microscopic or particulate alumina and titanium hydride in equal parts by weight for several days produced a very satisfactory result. Test assemblies employing filaments of 0.002" diameter tungsten wire embedded in this mix have withstood cyclic and continuous operation for periods of several hours without mechanical or electrical failure and without noticeable change in operating characteristics.

Additional advantages derived from the use of the hydride-insulator mix are that much less filament current is required to cause a given amount of gaseous emission than is necessary when unprepared hydride is used, indicating an increase in the energy transfer efficiency.

The test switch 765 is connected to the power source 760 through a relay-operated switch 770. This switch is normally closed against a contact 771, which in turn is connected to the test switch by a lead 772. However, when its controlling relay 773 is energized, the switch arm 770 is moved against the contact 774, which leads through a bell circuit 775 to ground. The relay 773 is connected to the fire warning system lead 754 by a lead 776 and the other side of the relay 773 is connected to the power source 760 by a lead 777.

The relay 773 is not actuated until current flows through the fire warning lamp 755, and then it is actuated simultaneously. Thus, when the pressure created by the test unit reaches the fire warning level, the relay 773 is energized and the switch 770 is moved against the contact 774, thereby ringing the bell and simultaneously opening the test circuit, so that the filament 762 cools and so that the hydride 763 is no longer overheated and will re-ingas properly. In normal operation (other than the test operation) the relay 773 is still actuated to ring the bell 775, but no current is sent through the test switch 765, since it is then open.

If, in testing, the operator forgets to open the test switch 765 when the bell 775 rings, the reingassing of the hydride 763 lowers the pressure and opens the fire alarm circuit, so that the relay 773 is de-energized and current then again flows through the filament 762. The relay 773 is de-energized and re-energized at a rate of about 5 cycles per second and the continuing ringing of the bell 775 gives the needed warning that the test switch 765 is closed. In any event, no harm is done.

The circuit shown in FIG. 8 incorporates a plurality of responders 750a, 750b, 750c, and 750d. The indicator lamps and lead lines and switches have been given the same numbers as in FIG. 7, with the addition of the letters, a, b, c, and d, depending upon which responder they are connected to. There is only one relay 773, which operates the switch 770 the same as before, except that it is energized when any one of the fire warning circuits becomes energized. There are two further additions: (1) a series of rectifiers, 780a, 780b, 780c, and 780d, is used to connect the relay 773 to the fire warning leads 754a, 754b, 754c, and 754d. The rectifiers isolate each system from the others, with respect to the relay circuit. (2) Each test circuit has a separate test switch 765a, 765b, 765c, and 765d.

The employment of the relay 773 reduces the current drawn through the fire alarm contact, because a sensitive relay draws much less current than a straight bell system. The relay circuit also allows the use of a standard bell with one side grounded, instead of requiring an ungrounded bell, and there is no need for a condenser across the alarm contacts.

The relay 773 also enables a faster test response because the hydride 763 can be fully ingassed, since it will not be subjected to too great heating or to heating for too long a period. This simplifies the ingassing procedure.

In the multiple system of FIG. 8, the relay 773 serves to prevent the testing of any of the responders 750a, 750b, 750c, and 750d while any one of them is giving a fire alarm.

If the sensor A contains a charge of argon, the argon pressure in the sensor depends upon the average temperature along the length of the sensor A. If some hydrogen is present in addition to the argon, the total pressure in the sensor is the sum of the partial pressures of the argon and the hydrogen. When the test switch 765 in FIG. 7 is closed, the hydrogen partial pressure in the sensor A is increased, until the fire-warning blister 752 is deflected, causing the relay 773 to cut the current to the test filament 762. The point at which the blister 752 deflects is a measure of the average temperature of the sensor A, since the hotter the sensor the higher the argon pressure and the less additional hydrogen pressure needed to cause deflection. Therefore, if the test switch 765 is kept closed, the system will cycle, with the filament 762 heating, the relay 773 opening the filament circuit, the filament 762 cooling, the relay 773 closing the filament circuit, and so on, at a rate determined by the hydrogen pressure needed to cause deflection of the diaphragm blister 752. Thus the cycling rate depends directly on the temperature of the sensor A.

A well-damped ammeter 779 may be placed in series with the filament 762 and the switch 765. Since the ammeter responds to the average current in the test circuit, it can be calibrated to read directly the temperature of the sensor A, for the higher the sensor temperature, the lower the ammeter reading, and vice versa. The system still functions as a fire detector when the temperature of the sensor A gets high enough to cause the transducing agent E in the sensor A to outgas.

If desired, a variable voltage source may be used to power the test filament 762 and may be set so that an alarm, consisting of the flashing light 755, is given at any preset overheat temperature. In this way it is possible to eliminate the overheat blister 753 and its lamp 757 and circuit.

This arrangement can also be adapted to more than one fire detector by providing a switch that will place the ammeter 779 in each test circuit, one at a time.

As brought out many times herein, I utilize molybdenum metal in novel ways. For example, the molybdenum ribbon 71 succeeds where ribbons of stainless steel, nickel, manganese, iron, aluminum, copper, etc. failed, because they reacted with zirconium, titanium, etc. to form alloys with eutectic points below the melting points of the individual metals. In the operating range herein, molybdenum solves the problem; it does not weld to the wire 70, or plug the gas passage, or form a low-melting-point alloy, and it gets stronger instead of weaker in the presence of zirconium and titanium. Its effect on the hydrides is to shift the alpha-beta transition point favorably, i.e., to lower it. Note that FIG. 5 and others show the wire-ribbon combination in the fully ingassed state. When outgassed, the ribbon 71 is loose in the tube 72, for the wire 70 expands about 15% as a result of ingassing and contracts when outgassing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A temperature detecting system, comprising a first tube containing reversible heat-sensitive gas-emitting means; a diaphragm; a housing divided by said diaphragm into two chambers, namely, a first chamber in communication with the interior of said tube and a second chamber isolated therefrom; switch means in said second chamber closed by movement of said diaphragm; an electrical circuit connected across said switch means and having a normally-open sensitive relay therein; signal means actuated by said relay upon energization thereof due to closure of said switch means; a second tube opening into said first chamber and otherwise closed; reversible gas-emitting means in said second tube; electrical heating means for heating said gas-emitting means in said second tube; a normally closed switch in series with said electrical heating means and opened by said relay, upon energization thereof; and a normally open manual test switch in series with both said electrical heating means and said normally closed switch.

2. The system of claim 1 wherein there is also an ammeter in series with said electrical heating means calibrated to read in temperature, so that when said manual test switch is held closed, said ammeter reads the average temperature of said first tube.

3. A temperature detection system comprising a plurality of first tubes, each containing means for releasing significant quantities of gas when heated; a plurality of diaphragms; a plurality of housings each divided by a said diaphragm into two chambers, namely, a first chamber in communication with the interior of a said tube and a second chamber isolated therefrom; switch means in each said second chamber closed by movement of its said diaphragm; a first electrical lead from each said switch means; a source of electrical current; a second electrical lead connected to each said first lead by a rectifier; a normally open relay with one side connected to said second lead and the other side to said source of electrical current; signal means actuated by closure of said relay upon energization thereof by closure of said switch means; a plurality of second tubes, each opening into a said first chamber and otherwise closed; reversible gas-emitting means in each said second tube; an electrical filament in each said second tube for heating the gas-emitting means therein; and means connecting each filament to said current source through (1) a separate manual switch for each filament and (2) a normally-closed relay-operated switch in series with all said manual switches and opened upon energization of said relay.

4. A temperature detecting system, comprising a first tube containing a metallic hydride; a diaphragm; a housing divided by said diaphragm into two chambers, namely, a first chamber in communication with the interior of said tube and a second chamber isolated therefrom; switch means in said second chamber closed by movement of said diaphragm; an electrical circuit connected across said switch means and having a normally-open sensitive relay therein; signal means actuated by said relay upon energization thereof due to closure of said switch means; a second tube opening into said first chamber and otherwise closed and containing a metallic hydride; electrical heating means for heating said hydride in said second tube; a normally closed switch in series with said electrical heating means and opened by said relay, upon energization thereof; and a normally open manual test switch in series with both said electrical heating means and said normally closed switch.

5. The system of claim 4 wherein there is also an ammeter in series with said electrical heating means, said ammeter being calibrated to read in temperature terms to indicate the temperature of said first tube when operating said system with said test switch closed, the automatic cut-off of said normally closed switch by said relay then providing for a cycling action.

References Cited by the Examiner

UNITED STATES PATENTS

| 1,684,530 | 9/1928 | Bast | 200—140 |
| 2,363,551 | 11/1944 | Roeder | 340—214 |
| 2,493,351 | 1/1950 | Jones | 340—229 |
| 2,832,068 | 4/1958 | Warren | 340—213.1 |
| 3,041,821 | 7/1962 | Lindberg | 340—214 |

FOREIGN PATENTS

| 11,393 | 3/1914 | Great Britain. |

OTHER REFERENCES

"Continuous Tube Fire Detector," in Aviation Week, vol. 52, No. 18, May 1, 1950; page 25.

Gibb, Jr., T. R. P., "Hydrides", in Journal of Chemical Education, October 1948 (pp. 577–582 relied on).

Sneed, M. C. et al., Comprehensive Inorganic Chemistry, vol. 6, D. Van Nostrand Co., Inc., 1957; pp. 112–117 relied on).

NEIL C. READ, *Primary Examiner.*